United States Patent
Yamaguchi

(10) Patent No.: US 10,293,595 B2
(45) Date of Patent: May 21, 2019

(54) APPARATUS AND METHOD FOR FABRICATING THREE-DIMENSIONAL OBJECT

(71) Applicant: RICOH COMPANY, LTD., Tokyo (JP)

(72) Inventor: Daichi Yamaguchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 76 days.

(21) Appl. No.: 15/472,500

(22) Filed: Mar. 29, 2017

(65) Prior Publication Data

US 2017/0305142 A1    Oct. 26, 2017

(30) Foreign Application Priority Data

Apr. 25, 2016 (JP) ................. 2016-087252
Jan. 23, 2017 (JP) ................. 2017-009099

(51) Int. Cl.
| | | |
|---|---|---|
| *B32B 3/02* | (2006.01) | |
| *B33Y 80/00* | (2015.01) | |
| *B33Y 10/00* | (2015.01) | |
| *B33Y 30/00* | (2015.01) | |
| *B33Y 50/02* | (2015.01) | |
| *B29C 64/165* | (2017.01) | |
| *B29C 64/393* | (2017.01) | |
| *B29C 64/336* | (2017.01) | |

(52) U.S. Cl.
CPC ............ *B33Y 80/00* (2014.12); *B29C 64/165* (2017.08); *B29C 64/393* (2017.08); *B33Y 10/00* (2014.12); *B33Y 30/00* (2014.12); *B33Y 50/02* (2014.12); *B29C 64/336* (2017.08)

(58) Field of Classification Search
CPC ......... B33Y 10/00; B33Y 30/00; B33Y 50/02; B33Y 80/00; B29C 64/165
See application file for complete search history.

(56) References Cited

U.S. PATENT DOCUMENTS

| | | | | |
|---|---|---|---|---|
| 2016/0168453 A1* | 6/2016 | Florio | ............... | C09K 8/80 507/203 |
| 2017/0232676 A1* | 8/2017 | Jaunet | ............... | B33Y 10/00 264/308 |

FOREIGN PATENT DOCUMENTS

| | | |
|---|---|---|
| JP | 2009-275097 | 11/2009 |
| JP | 2011-230397 | 11/2011 |

(Continued)

*Primary Examiner* — Elizabeth E Mulvaney
(74) *Attorney, Agent, or Firm* — Oblon, McClelland, Maier & Neustadt, L.L.P.

(57) ABSTRACT

An apparatus for fabricating a three-dimensional object includes a flattening unit, a fabrication liquid discharger, and circuitry. The flattening unit transfers and flattens powder deposited on the stage. The fabrication liquid discharger discharges droplets of fabrication liquid on a surface of the powder on the stage to bind the powder together to fabricate a layered fabrication object. The circuitry repeats an operation of transferring and flattening the powder by the flattening unit and an operation of discharging droplets of the fabrication liquid on the surface of the powder on the stage by the fabrication liquid discharger to fabricate the three-dimensional object by a process of lamination. The circuitry discharges a plurality of first droplets of the fabrication liquid on the surface of the powder on the stage such that at least two adjacent first droplets partially overlap.

19 Claims, 13 Drawing Sheets

(56) References Cited

FOREIGN PATENT DOCUMENTS

| JP | 2012-125996 | 7/2012 |
| JP | 2012-125997 | 7/2012 |
| JP | 2013-208878 | 10/2013 |
| JP | 2015-202625 | 11/2015 |

\* cited by examiner

POWDER SUPPLY

FLATTENING

RETURN

FABRICATION

APPARATUS AND METHOD FOR FABRICATING THREE-DIMENSIONAL OBJECT

CROSS-REFERENCE TO RELATED APPLICATIONS

This patent application is based on and claims priority pursuant to 35 U.S.C. § 119(a) to Japanese Patent Application No. 2017-009099, filed on Jan. 23, 2017 and No. 2016-087252, filed on Apr. 25, 2016, in the Japan Patent Office, the entire disclosure of each of which is hereby incorporated by reference herein.

BACKGROUND

Technical Field

Aspects of the present disclosure relate to an apparatus and a method for fabricating a three-dimensional object.

Related Art

As a solid (three-dimensional) fabricating apparatus, for example, a powder lamination fabrication method is used to fabricate a solid (three-dimensional) object. In this method, for example, powder is flattened after the powder is overlaid on a fabrication stage, and fabrication liquid for binding powder particles is applied to the flattened layered powder (referred to as a "powder layer") to form a layered fabrication object (referred to as "fabrication layer") in which powder particles are bound together. An operation of forming a powder layer on the fabrication layer to form another fabrication layer is repeated to laminate the fabrication layers one atop another, thus fabricating a three-dimensional object.

SUMMARY

An improved apparatus for fabricating a three-dimensional object includes a stage, a flattening unit, a fabrication liquid discharger, and circuitry. The flattening unit transfers and flattens powder deposited on the stage. The fabrication liquid discharger discharges droplets of fabrication liquid on a surface of the powder on the stage to bind the powder together to fabricate a layered fabrication object. The circuitry repeats an operation of transferring and flattening the powder by the flattening unit and an operation of discharging droplets of the fabrication liquid on the surface of the powder on the stage by the fabrication liquid discharger to fabricate the three-dimensional object by a process of lamination. The circuitry discharges a plurality of first droplets of the fabrication liquid on the surface of the powder on the stage such that at least two adjacent first droplets partially overlap. Then, the circuitry discharges a second droplet, a liquid amount of which is smaller than a liquid amount of each of the first droplets, on a portion between the two adjacent first droplets partially overlapping in an arrangement direction of the first droplets discharged on the surface of the powder.

DETAILED DESCRIPTION

Figure 1:
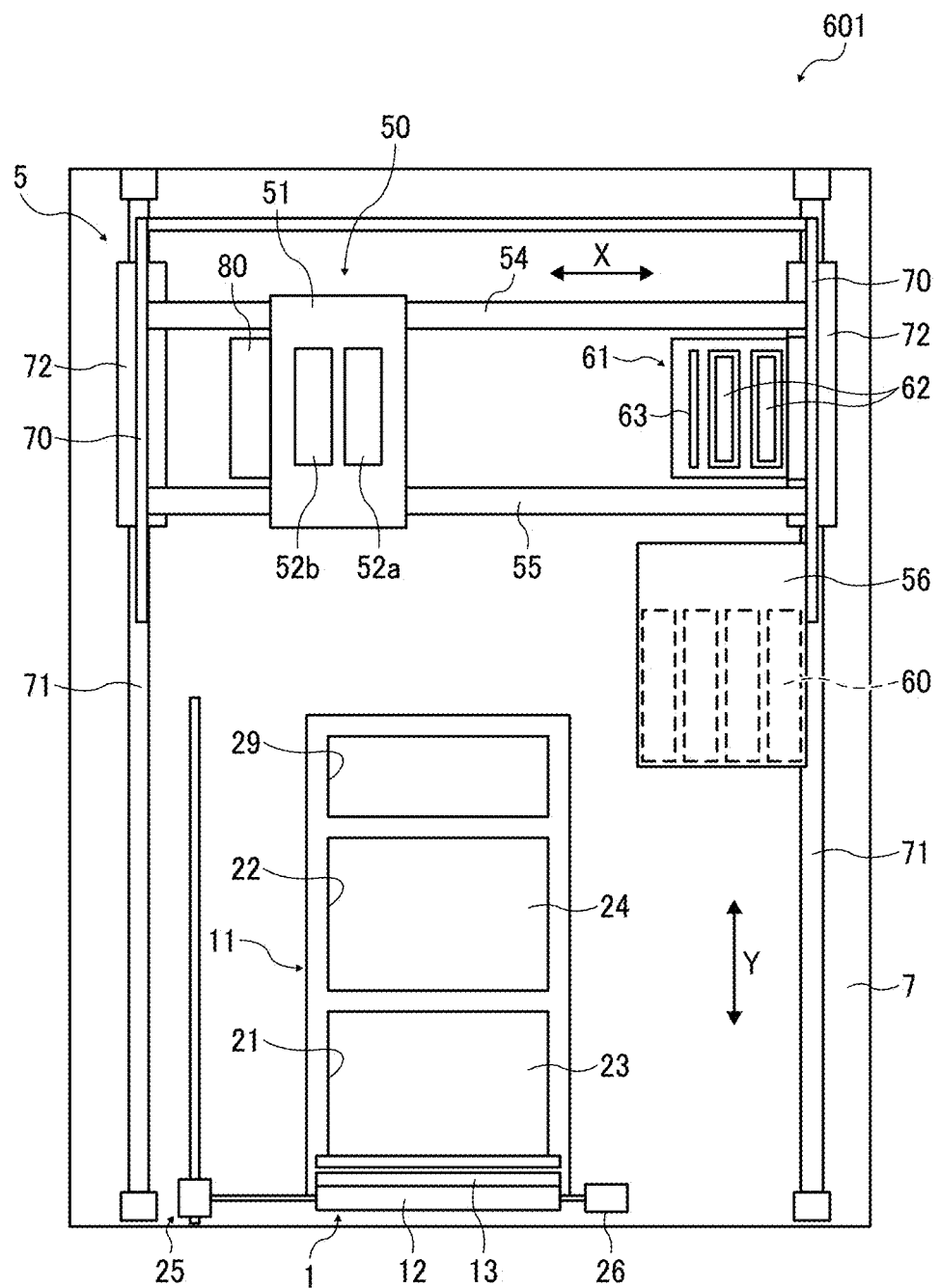
FIG. 1 is a plan view of a three-dimensional apparatus according to a first embodiment of the present disclosure.

Referring now to the drawings, wherein like reference numerals designate identical or corresponding parts throughout the several views, embodiments of the present disclosure are described below.

Figure 2:
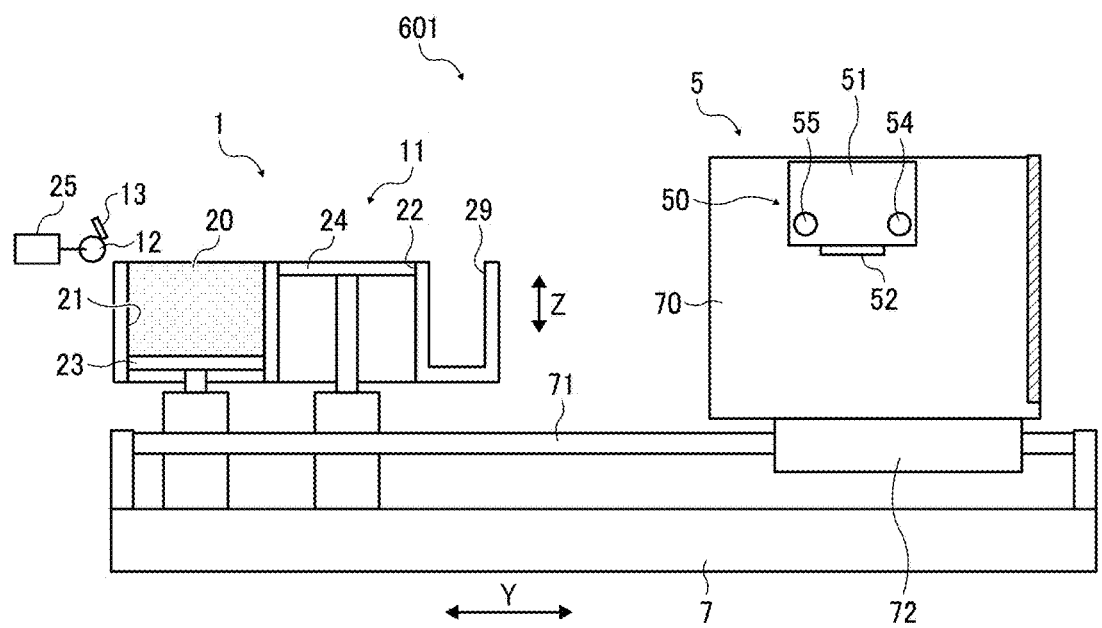
FIG. 2 is a side view of the three-dimensional apparatus of FIG. 1.
Figure 3:
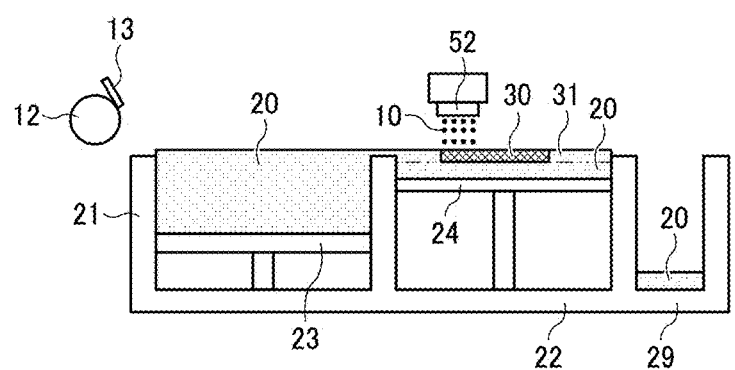
FIG. 3 is a cross-sectional view of a fabrication section of FIG. 1.

First, an example of a three-dimensional fabricating apparatus according to a first embodiment of this disclosure is described with reference to FIGS. 1 through 3. FIG. 1 is a plan view of the three-dimensional fabricating apparatus. FIG. 2 is a side view of the three-dimensional fabricating apparatus. Further, FIG. 3 is a cross-sectional view of a fabrication section of the three-dimensional fabricating apparatus during fabricating a three-dimensional object.

In this embodiment, a three-dimensional fabricating apparatus 601 for fabricating a three-dimensional object is a powder lamination fabricating apparatus. The three-dimensional fabricating apparatus 601 includes a fabrication section 1 and a fabrication unit 5.

The fabrication section 1 forms a fabrication layer 30 that is a layered fabrication object in which powders are bound together. The fabrication unit 5 fabricates a fabrication layer 30 by discharging fabrication liquid 10 onto a powder layer 31 that is overlaid in layers in the fabrication section 1.

The fabrication section 1 includes a powder chamber 11 and a flattening roller 12 as a rotary member that is a flattening unit (recoater). Note that the flattening unit may be, for example, a plate member (blade) instead of the rotary member shown in the figure.

The powder chamber 11 includes a supply chamber 21 to retain powder 20 to be supplied to the fabrication chamber 22 and a fabrication chamber 22 in which fabrication layers 30 are laminated to fabricate a laminated layered fabrication object. The flattening roller 12 moves and supplies the powder from the supply chamber 21 to the fabrication chamber 22 to form a powder layer in the fabrication chamber 22. The powder chamber 11 further includes a surplus powder chamber 29 to store the powder, which is dropped from the fabrication chamber 22 without contributing to forming a powder layer 31 during formation of the powder layer 31.

A bottom portion of the supply chamber 21 acts as a supply stage 23 and is movable upward and downward in a vertical direction (height direction). Similarly, a bottom of the fabrication chamber 22 acts as a fabrication stage 24 and is movable upward and downward in a vertical direction (height direction). A three-dimensional object in which the fabrication layers 30 are laminated is fabricated on the fabrication stage 24. An assembly to vacuum up powder 20 is provided at the bottom face of the surplus powder chamber 29. The surplus powder chamber 29 is easily removed from the fabrication section 1.

A motor 27, which will be described later, moves the supply stage 23 upward and downward along a direction (height direction) indicated by arrow Z. Likewise, a motor 28 moves the fabrication stage 24 upward and downward along the direction indicated by arrow Z. Motors 27 and 28 are shown schematically in FIG. 4.

The flattening roller 12 transfers and supplies the powder 20 supplied on the supply stage 23 of the supply chamber 21 to the fabrication chamber 22. The flattening roller 12 as flattening unit smooths and flattens the surface of the layer of the powder 20, which is supplied by the flattening roller 12 to the fabrication chamber 22, to form the powder layer 31.

The flattening roller 12 is disposed to be relatively reciprocally movable with respect to a stage surface (a surface on which powder 20 is stacked) of the fabrication stage 24 along a direction indicated by arrow Y in FIG. 1 and FIG. 2, which is a direction along the stage surface of the fabrication stage 24. The flattening roller 12 is moved by a reciprocal moving assembly 25. The flattening roller 12 is driven to rotate by a motor 26.

The fabrication unit 5 includes a liquid discharge unit 50 to discharge fabrication liquid 10 to the powder layer 31 on the fabrication stage 24.

The liquid discharge unit 50 includes a carriage 51 and two liquid discharge heads (hereinafter referred to as simply "head(s)" 52) 52a and 52b mounted on the carriage 51, which act as fabrication liquid applier. In FIG. 1, two liquid discharge heads are illustrated. However, in some embodiments, the number of liquid discharge heads is one, or three or more.

The carriage 51 is movably held with guides 54 and 55. The guides 54 and 55 are held with lateral side plates 70, which are provided on both sides of the fabrication unit 5, so as to be movable upward and downward.

Via a pulley and a belt, an X-direction scanning motor constituting an X-direction scanning assembly 550 reciprocally moves the carriage 51 along the direction indicated by arrow X that is a main scanning direction. Note that, hereinafter, the direction indicated by arrow X is simply referred to as "X direction", and the same applies to "Y direction" and "Z direction".

Each of the two heads 52a and 52b (hereinafter, referred to collectively as "heads 52" unless distinguished) includes two nozzle rows, each including a plurality of nozzles arrayed to discharge fabrication liquid. Two nozzle rows of one head 52a discharge cyan fabrication liquid and magenta fabrication liquid. Two nozzle rows of the other head 52b discharge yellow fabrication liquid and black fabrication liquid. Note that the configuration of head is not limited to the above-described configuration of the heads 52 and may be any other suitable configuration.

A tank mount 56 mounts a plurality of tanks 60 containing cyan fabrication liquid, magenta fabrication liquid, yellow fabrication liquid, and black fabrication liquid. The fabrication liquids are supplied to the heads 52a and 52b through, e.g., supply tubes from the tanks 60.

Further, a maintenance assembly 61 to maintain the heads 52 of the liquid discharge unit 50 in good condition is disposed at one end in the X direction.

The maintenance assembly 61 includes caps 62 and a wiper 63. The caps 62 are brought into close contact with nozzle faces (nozzle formed faces) of the heads 52, and fabrication liquid is vacuumed up from nozzles. Thus, powder clogging the nozzles and encrusted fabrication liquid are discharged from the nozzles of the heads 52. Then, the wiper 63 wipes the nozzle faces to form menisci in the nozzles (with the interiors of the nozzles being in a state of negative pressure). When fabrication liquid is not discharged, the maintenance assembly 61 covers the nozzle faces of the heads 52 with the caps 62 to prevent incorporation of the powder 20 into the nozzles and drying of the fabrication liquid 10 inside the nozzles.

The fabrication unit 5 includes a slider portion 72 slidably supported on a guide 71 above a base 7. The entire fabrication unit 5 is reciprocally movable back and forth in the Y direction (sub-scanning direction) perpendicular to the X direction. The entire fabrication unit 5 is reciprocally moved along the Y direction by the Y-direction scanning assembly 552.

The liquid discharge unit 50 is disposed to be movable upward and downward along the Z direction together with the guides 54 and 55. A Z-direction elevation assembly 551 moves the liquid discharge unit 50 upward and downward along the Z direction.

In the following, the fabrication section 1 is further described.

The powder chamber 11 has a box shape and includes three chambers, the supply chamber 21, the fabrication chamber 22, and the surplus powder chamber 29, each of which is open at the upper side thereof. The supply stage 23 and the fabrication stage 24 are arranged inside the supply chamber 21 and the fabrication chamber 22, respectively, so as to be movable upward and downward.

Lateral faces of the supply stage 23 are disposed to contact inner lateral faces of the supply chamber 21. Lateral faces of the fabrication stage 24 are disposed to contact inner lateral faces of the fabrication chamber 22. The top faces of the supply stage 23 and the fabrication stage 24 are held horizontally.

The surplus powder chamber 29 is disposed next to the fabrication chamber 22. The surplus powder chamber 29 receives surplus powder 20 discharged outside the fabrication chamber 22. The surplus powder chamber 29 has a funnel shape and includes a discharge port 29a which discharges the powder 20 at the bottom portion of the surplus powder chamber 29.

The surplus powder chamber 29 receives the surplus powder 20 dropped into the surplus powder chamber 29. The surplus powder 20 is the powder 20, which is transferred by the flattening roller 12 to the fabrication chamber 22 during formation of the powder layer 31, and is dropped to the surplus powder chamber 29 from the fabrication chamber 22. The surplus powder 20 dropped to the surplus powder chamber 29 is transferred to the powder supplier 554 via a powder collecting and recycling apparatus, for example. The powder supplier 554 supplies powder 20 to the supply chamber 21.

The powder supplier 554 is disposed above the supply chamber 21. In an initializing operation of fabrication or when the amount of the powder 20 in the supply chamber 21 decreases, the powder 20 in the tanks 60 constituting the powder supplier 554 is supplied to the supply chamber 21. Examples of a powder transporting method for supplying powder include a screw conveyor method utilizing a screw and an air transport method utilizing air.

The flattening roller 12 transfers and supplies powder 20 from the supply chamber 21 to the fabrication chamber 22 and smooths and flattens the surface of the powder 20 to form a powder layer 31 as a layered powder having a desired thickness.

The flattening roller 12 is a cylindrical bar longer than an inside dimension of the fabrication chamber 22 and the supply chamber 21 (that is, a width of a portion to which powder 20 is supplied or stored). The reciprocal moving assembly 25 reciprocally moves the flattening roller 12 in the Y direction (a sub-scanning direction) along the stage surface on the supply chamber 21 and the fabrication chamber 22.

The flattening roller 12, while being rotated by the motor 26 of the reciprocal moving assembly 25, horizontally moves forward and backward to pass an area above the supply chamber 21 and the fabrication chamber 22 from outside the supply chamber 21. Accordingly, the powder 20 is transferred and supplied onto the fabrication chamber 22, and the flattening roller 12 flattens the powder 20 while passing over the fabrication chamber 22, thus forming the powder layer 31.

As illustrated in FIG. 2, a powder removing blade 13 act as a powder remover is arranged to contact a circumference surface of the flattening roller 12 to remove the powder 20 attached to the flattening roller 12.

The powder removing blade 13 moves together with the flattening roller 12 while the powder removing blade 13 contacts the circumference surface of the flattening roller 12. The powder removing blade 13 may be oriented in any direction to follow or counter a direction of rotation of the flattening roller 12 to flatten the powder 20.

Figure 4:
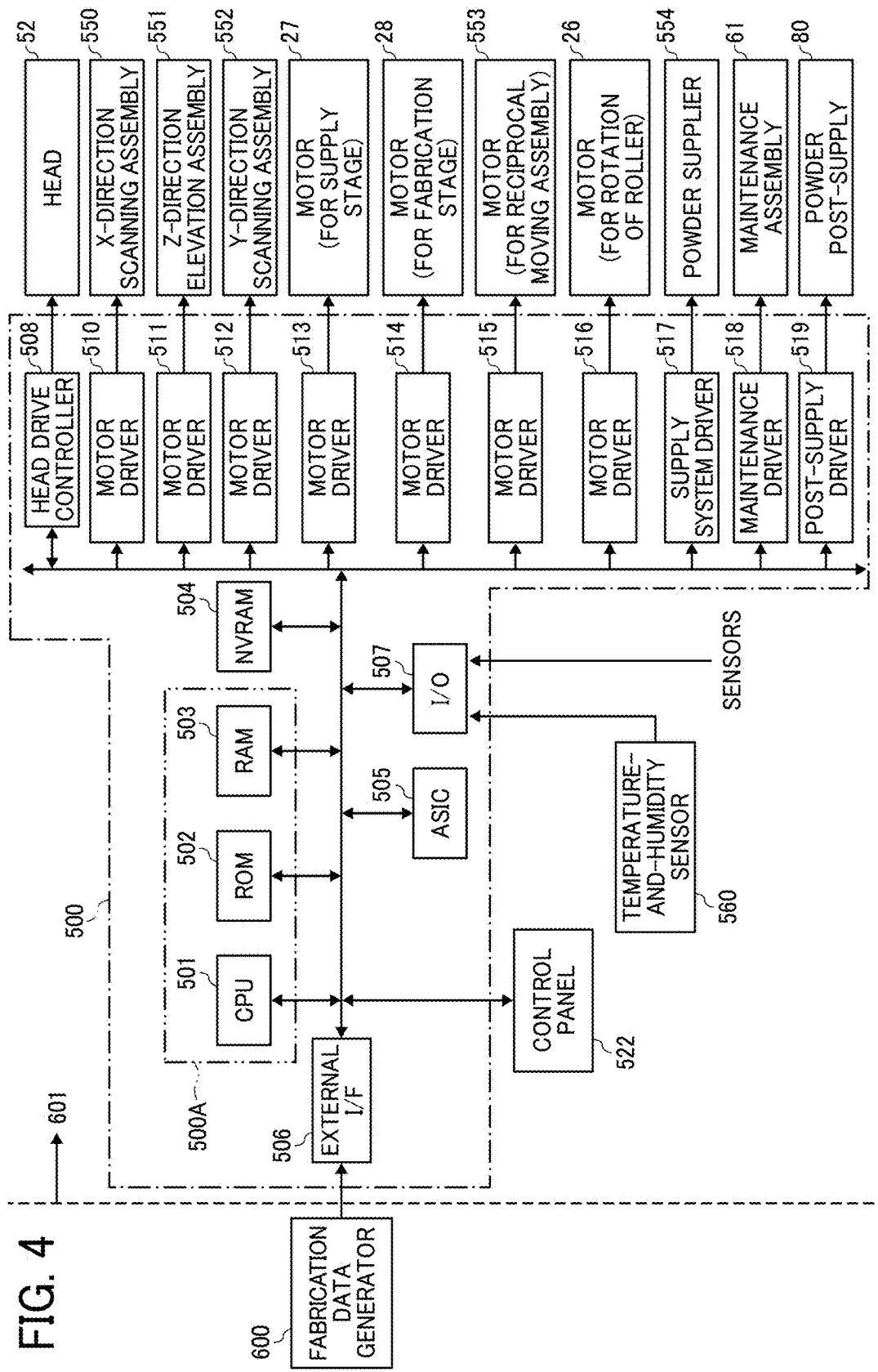
FIG. 4 is a schematic block diagram of a controller of the three-dimensional fabricating apparatus in the first embodiment.

Next, an outline of a controller of the three-dimensional fabricating apparatus in this embodiment is described with reference to FIG. 4. FIG. 4 is a block diagram of the controller.

A control circuit 500 includes a main controller 500A. The main controller 500A includes a central processing unit (CPU) 501, a read-only memory (ROM) 502, and a random access memory (RAM) 503. The CPU 501 manages the control of the entire three-dimensional fabricating apparatus 601. The ROM 502 stores programs executed by the CPU 501 and other fixed data. The programs stored in the ROM 502 include programs for causing the CPU 501 to execute control of three-dimensional fabricating operation, which includes control according to embodiments of the present disclosure. The RAM 503 temporarily stores fabrication data and other data.

The control circuit 500 further includes a nonvolatile random access memory (NVRAM) 504 to store data even when power to the apparatus is blocked. In addition, the control circuit 500 further includes an application specific integrated circuit (ASIC) 505 to perform image processing to handle various signals related to image data and input/output signals to control the apparatus entirely.

The control circuit 500 also includes an interface (I/F) 506 to send and receive data and signals used in receiving fabrication data from an external fabrication data generator 600.

The fabrication data generator 600 is an apparatus for generating data to fabricate a three-dimensional object according to the embodiment of the present disclosure. The fabrication data generator 600 generates fabrication data in which a final-form object (three-dimensional object) is virtually sliced in multiple fabrication layers, and is constituted of an information processing apparatus, such as a personal computer.

The control circuit 500 includes an input-output (I/O) unit to receive detection signals from various sensors.

The control circuit 500 includes a head drive controller 508 to control driving of the heads 52 of the liquid discharge unit 50.

The control circuit 500 includes a motor driver 510 and a motor driver 512. The motor driver 510 drives a motor constituting the X-direction scanning assembly 550 to move the carriage 51 of the liquid discharge unit 50 in the X direction (the main scanning direction). The motor driver 512 drives a motor constituting the Y-direction scanning assembly 552 to move the fabrication unit 5 in the Y direction (the sub-scanning direction).

The control circuit 500 includes a motor driver 511 to drive a motor constituting the Z-direction elevation assembly 551 to move (elevate) the carriage 51 of the liquid discharge unit 50 upward and downward in the Z direction. The motor driver 511 may alternatively elevate the fabrication unit 5 as a whole in the Z-direction.

The control circuit 500 includes a motor driver 513 and a motor driver 514. The motor driver 513 drives the motor 27 to elevate the supply stage 23 upward and downward. The motor driver 514 drives the motor 28 to elevate the fabrication stage 24 upward and downward.

The control circuit 500 includes a motor driver 515 to drive a motor 553 of the reciprocal moving assembly 25 that moves the flattening roller 12, and a motor driver 516 to drive a motor 26 that drives and rotates flattening roller 12.

The control circuit 500 includes a supply system driver 517 and a maintenance driver 518. The supply system driver 517 drives the powder supplier 554 to supply powder 20 to the supply chamber 21. The maintenance driver 518 drives the maintenance assembly 61 of the liquid discharge unit 50.

The control circuit 500 includes a post-supply driver 519 to cause a powder post-supply 80 to supply the powder 20.

The I/O unit 507 of the control circuit 500 receives detection signals from, e.g., a temperature-and-humidity sensor 560 to detect temperature and humidity as environmental conditions of the apparatus and receives detection signals from other sensors.

A control panel 522 used to input and display information necessary to the three-dimensional fabricating process is connected to the control circuit 500.

As described above, the control circuit 500 receives fabrication data from the fabrication data generator 600. The fabrication data includes shape data (fabrication data) for each of the fabrication layers 30 as slice data. The slice data is obtained by virtually slicing the shape of the target three-dimensional object into multiple layers.

The main controller 500A then activates the head 52 to discharge fabrication liquid according to the fabrication data of the fabrication layer 30.

Note that the fabrication data generator 600 and the three-dimensional fabricating apparatus (powder lamination fabricating apparatus) 601 together constitute a fabrication system.

Next, steps in the fabrication process will be described referring to FIGS. 5A to 5E. FIGS. 5A to 5E are schematic views illustrating the flow of the fabrication process.

Here, the fabrication process is described from a state where the first layer of the fabrication layer 30 is formed on the fabrication stage 24 of the fabrication chamber 22.

Figure 5A:
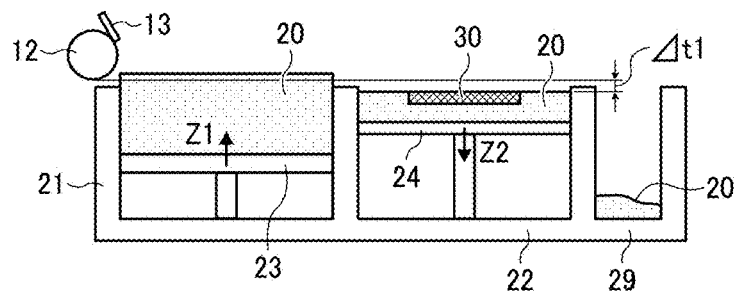
FIGS. 5A to 5E are schematic views illustrating a fabrication process performed by the three-dimensional apparatus of FIG. 1.

When forming the next fabrication layer 30 on this first fabrication layer 30, the supply stage 23 of the supply chamber 21 is moved upward in a direction indicated by arrow Z1, and the fabrication stage 24 of the fabrication chamber 22 is moved downward in Z2 direction as illustrated in FIG. 5A.

At this time, the downward moving distance of the fabrication stage 24 is set such that the distance (lamination pitch) between a top face of the surface of the powder layer 31 (powder surface) in the fabrication chamber 22 and the lower portion (lower tangent line) of the flattening roller 12 to be Δt1. The distance Δt1 corresponds to the thickness (lamination pitch) of the powder layer 31 to be formed next time. The distance Δt1 is preferably about several tens μm to 100 μm.

In this case, the flattening roller 12 is disposed to have a gap against the top end face of each of the supply chamber 21 and the fabrication chamber 22. Therefore, a surface of the powder layer 31 (powder surface) is positioned higher than a surface of the top end face of each of the supply chamber 21 and the fabrication chamber 22 when the flattening roller 12 transfers the powder 20 to the fabrication chamber 22 and flattens the powder 20 in the fabrication chamber 22.

The present embodiment can thereby prevent the flattening roller 12 from contacting the top end faces of the supply chamber 21 and the fabrication chamber 22 and thereby prevent damage to the flattening roller 12. If the surface of the flattening roller 12 is damaged, streaky convexities or concavities are formed in the surface of the powder layer 31, degrading the surface of the powder layer 31.

Figure 5B:
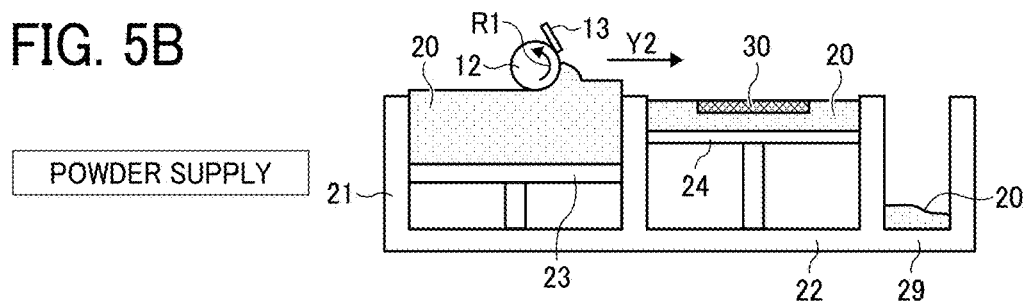

Next, as illustrated in FIG. 5B, in a powder supply process, the flattening roller 12 moves the powder 20 positioned higher than the level of the top face of the supply chamber 21 to the fabrication chamber 22 in Y2 direction while rotating the flattening roller 12 in the reverse direction as indicated by arrow R1 to transfer the powder 20 to the fabrication chamber 22 from the supply chamber 21.

Figure 5C:
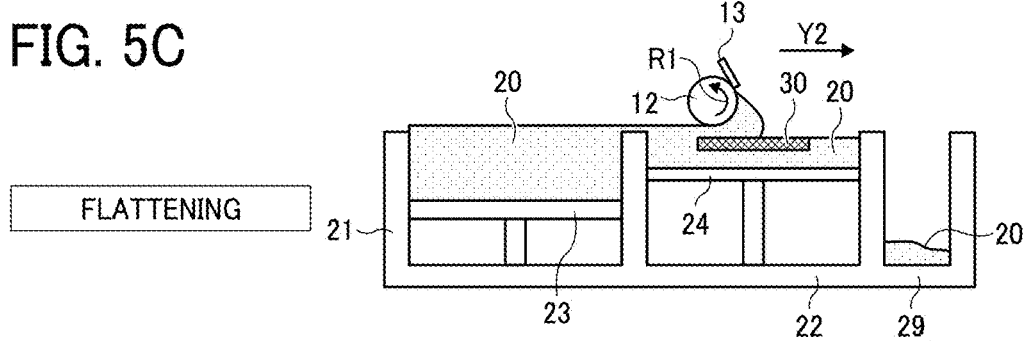

Next, as illustrated in FIG. 5C, in a flattening process, the flattening roller 12 moves parallel to the stage surface of the fabrication stage 24 of the fabrication chamber 22 to form the powder layer 31 such that the thickness of the powder layer 31 on the fabrication layer 30 on the fabrication stage 24 become a desired thickness Δt1. At this time, surplus of the powder 20, which has not been used for the formation of the powder layer 31, is dropped into the surplus powder chamber 29.

Figure 5D:
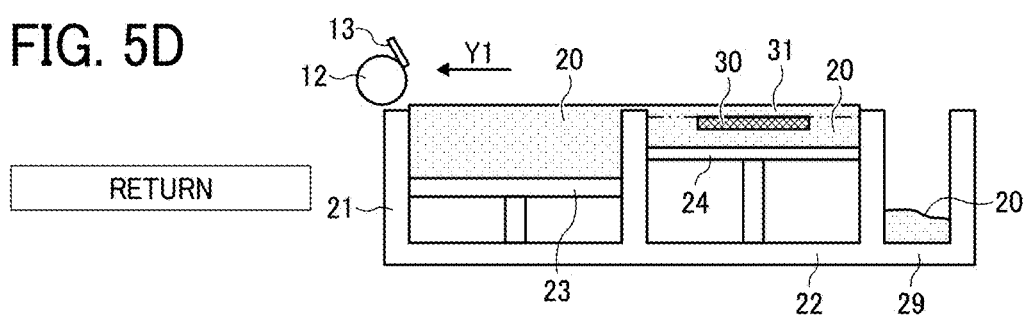

After the powder layer 31 is formed, in a return process as illustrated in FIG. 5D, the flattening roller 12 is moved in the direction indicated by arrow Y1 and returned to an initial position (original position).

Here, the flattening roller 12 is movable while maintaining a constant distance between the level of the top face of the fabrication chamber 22 and the supply chamber 21. Such a configuration allows formation of a uniform thickness Δt1 of the powder layer 31 on the fabrication chamber 22 or the already formed fabrication layer 30 while transporting the powder 20 to an area above the fabrication chamber 22 with the flattening roller 12.

Figure 5E:
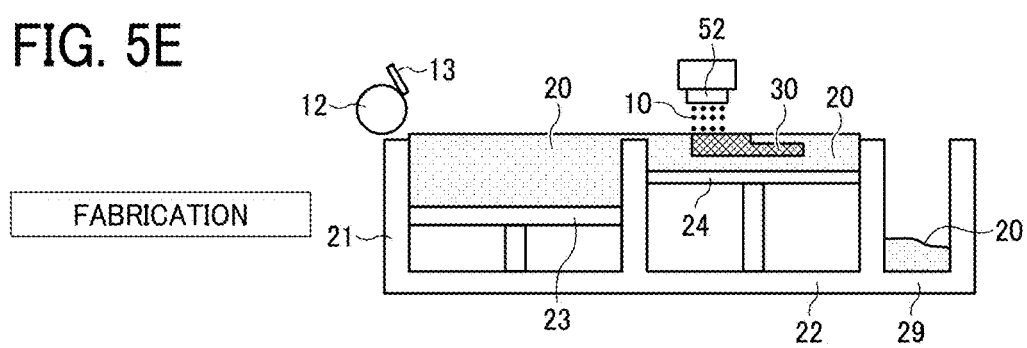

Then, in a fabrication process as illustrated in FIG. 5E, the head 52 of the liquid discharge unit 50 discharges liquid droplets of fabrication liquid 10 to laminate and form a fabrication layer 30 having a desired shape on the next powder layer 31.

When the fabrication liquid 10 discharged from the heads 52 is mixed with the powder 20, adhesives contained in the powder 20 are dissolved and bound together in the fabrication layer 30. Thus, particles of the powder 20 bind together to form the fabrication layer 30.

Then, by repeating the step of forming the powder layer 31 by the powder supply process and the flattening process and the step of discharging the fabrication liquid with the heads 52 (fabrication process) a required number of times, a new fabrication layer 30 is formed on the fabrication chamber 22. At this time, the newly formed fabrication layer 30 and the preceding fabrication layer 30 are united to form a part of a three-dimensional fabrication object (three-dimensional object).

Then, by repeating the step of forming the powder layer 31 by the powder supply process and flattening process and the step of discharging the fabrication liquid with the heads 52 for a required number of times (fabrication process), the process of fabricating the three-dimensional fabrication object (three-dimensional object) is completed.

Next, the powder (the powder material for three-dimensional fabrication) and the fabrication liquid used in the present embodiment will be described.

The powder material for three-dimensional fabrication includes a base material and a water-soluble organic material. The water-soluble organic material (binder) coats the base material with an average thickness of from 5 nm to 500 nm. The binder is dissolved and become cross-linkable by the effect of cross-linker containing water acting as the fabrication liquid.

In the powder material for three-dimensional fabrication, the water-soluble organic material that coats the base material is dissolved and become cross-linkable under the effect of the cross-linker containing water. Therefore, if the cross-linker containing water is added to the water-soluble organic material, the water-soluble organic material is dissolved and is cross-linked under the effect of cross-linker (crosslinking agent) included in the cross-linker containing water.

A thin layer (a powder layer 31) is formed by the powder material for three-dimensional fabrication, and the cross-linker containing water as the fabrication liquid 10 is discharged to the thin layer as described above. Thus, the powder layer 31 is bound and cured to form a fabrication layer 30 by the effect of the dissolved water-soluble organic material, which is cross-linked in the powder layer 31.

Figure 6A:
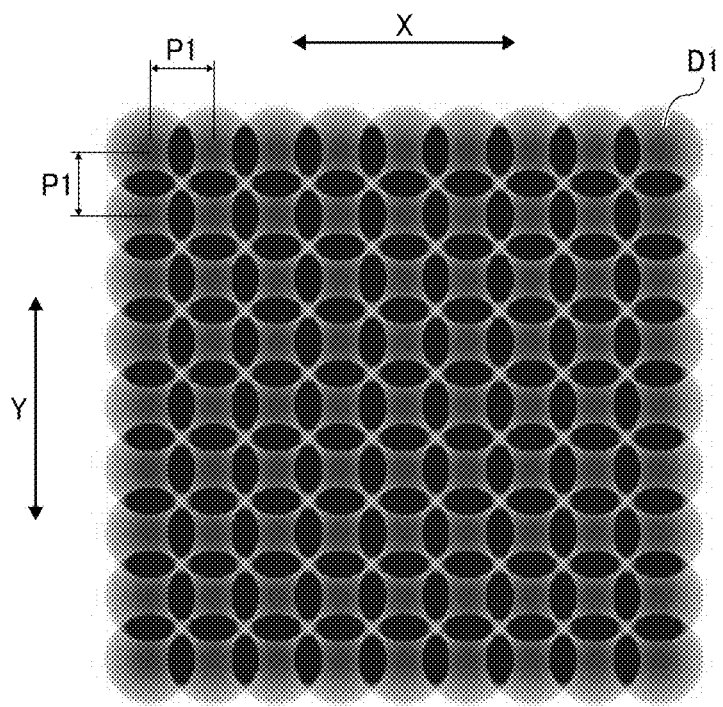
FIGS. 6A and 6B are illustrations of droplet discharge patterns on a surface of a powder layer according to the first embodiment of the present disclosure.
Figure 6B:
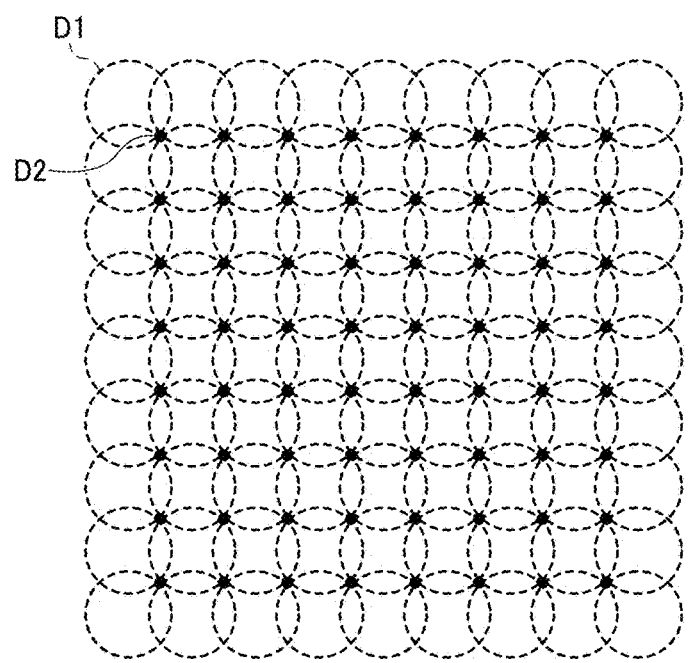
Figure 7:
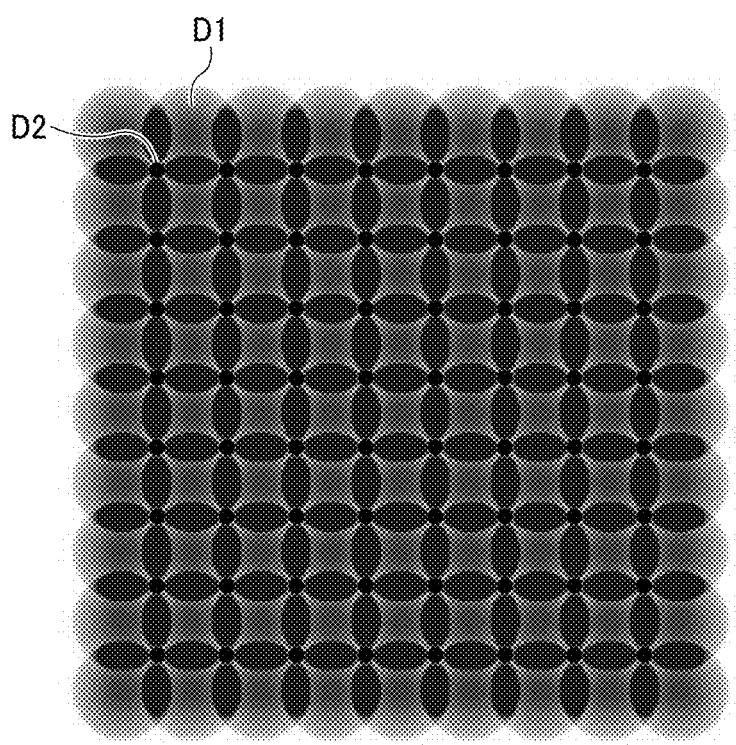
FIG. 7 is an illustration of a discharge pattern in which first droplets and second droplets overlap.

Next, referring to FIGS. 6A, 6B, and 7, a droplet discharge pattern to the surface of the powder layer 31 in the first embodiment of the present disclosure will be described. FIGS. 6A and 6B are illustrations of discharge patterns of first droplets and second droplets, respectively. FIG. 7 is an illustration of a discharge pattern in which the first droplets and the second droplets are overlapped. In FIG. 6 and FIG. 7, the patterns are illustrated as penetration regions of the liquid droplets landed on the powder layer 31 (the same applies hereinafter).

The first embodiment discharges the first droplets D1 having a first liquid amount and the second droplets D2 having a second liquid amount, which is smaller than the first liquid amount. In FIG. 6, the penetration regions of the first droplets are also written as "D1". Similarly, the penetration regions of the second droplets are also written as "D2".

As illustrated in FIG. 6A and FIG. 7, the first droplets D1 are discharged in grid shape arranged along the X direction and the Y direction with a predetermined distance P1 between the center positions of adjacent ones of the first droplets D1.

Here, to make the explanation simple, the distance between the nozzles of the head 52 is P1 (about 300 dpi for example), and the head 52 discharges the first droplets D1 in a grid shape arranged along the X direction and the Y direction with a predetermined distance P1 between the center positions of adjacent ones of the first droplets D1.

At this time, the penetration regions of two first droplets D1, which are disposed adjacent to each other in the X direction, are partially overlapped on the powder layer 31. Further, the penetration regions of two first droplets D1, which are disposed adjacent to each other in the Y direction, are also partially overlapped with each other on the powder layer 31.

As illustrated in FIG. 6B and FIG. 7, the second droplet D2 is discharged on a portion between two adjacent first droplets D1, which partially overlap in an arrangement direction of the first droplets D1 discharged on the surface of the flattened powder 20. The portion between the two adjacent first droplets D1 on which the second droplet D2 is discharged includes a portion where the two adjacent first droplets D1 do not overlap. The second droplet D2, which is discharged to the portion where the two adjacent first droplets D1 do not overlap, can be overlapped with other first droplets other than the above-described two adjacent first droplets D1.

Here, the control circuit 500 controls the head 52 to discharge the first droplets D1 so that adjacent four droplets of the first droplets D1 arranged in a grid shape partially overlap. Then, the control circuit 500 controls the head 52 to discharge the second droplet D2 on a central portion of adjacent four droplets of the first droplets D1 arranged in grid shape.

The first droplets D1 and the second droplets D2 are thereby discharged on the powder layer 31 in a pattern as illustrated in FIG. 7.

The discharge of the first droplets D1 and the discharge of the second droplets D2 can be operated by using two heads 52a and 52b separately. Further, a head that discharges different liquid amount with the heads 52a and 52b may be added separately.

Next, a state of the fabrication liquid and the powder when the fabrication liquid is discharged on the powder layer 31 will be described referring to FIGS. 8A to 8C, schematic views used for explanation.

The powder 20 is an aggregate of powder particles and so on (simply generally called as "particles" and written as "particles 20a", hereinafter).

Figure 8A:
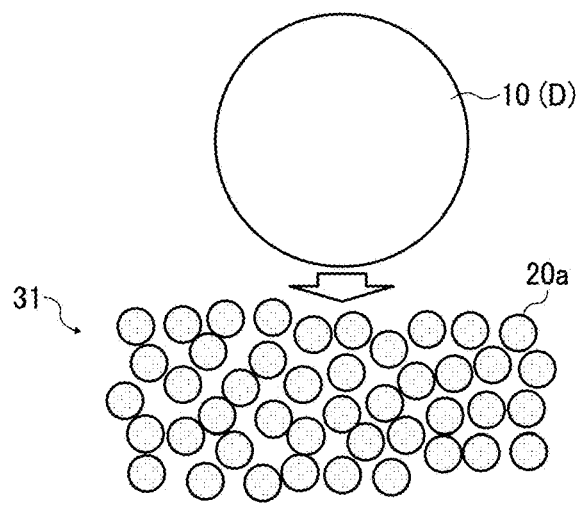
FIGS. 8A to 8C are schematic views of a state of fabrication liquid and powder when fabrication liquid is discharged on a powder layer.
Figure 8B:
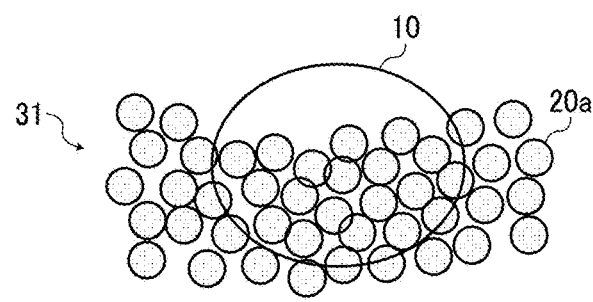

As illustrated in FIG. 8A, when a droplet D of the fabrication liquid 10 is discharged on the surface of the powder layer 31, the fabrication liquid 10 penetrates the powder layer 31 as illustrated in FIG. 8B. The particles 20a are moved and aggregate by the liquid bridge adhesive force of the fabrication liquid 10 and the progress of binding between the particles 20a.

Figure 8C:
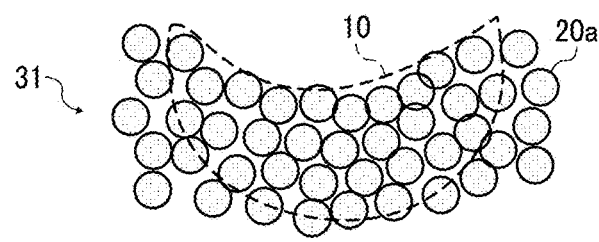

At this time, as illustrated in FIG. 8C, the penetration of the fabrication liquid 10 is deeper at the central portion of the droplet D and relatively shallower around the fabrication liquid 10. When looking at the penetration region of one droplet D, the aggregation of the particles progresses easily at the central portion of the droplet D. On the other hand, the aggregation of the particles on the periphery of the droplet D does not progress easily. Thus, compression of the surface layer on the periphery of the droplet D is less than the compression of the surface layer at the central portion of the droplet D. Therefore, a concave portion having a spherical crown shape is formed at the portion where the droplet D is landed.

Figure 9A:
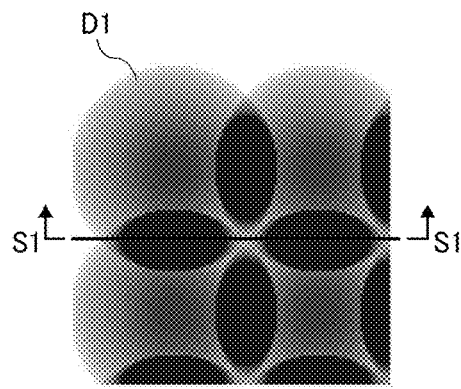
FIGS. 9A to 9C are cross-sectional profiles of a fabrication liquid discharged portion when only first droplets D1 are discharged as a comparative example.
Figure 9B:
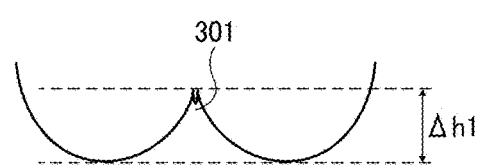

Next, a cross-sectional profile of a fabrication liquid discharged portion when only the first droplets D1 are discharged will be described with reference to FIG. 9 as a comparative example. FIG. 9A is a plan view of the fabrication liquid discharged portion. FIG. 9B is a cross-sectional profile of the fabrication liquid discharged portion along the line S1-S1 in FIG. 9A, and FIG. 9C is a schematic view of the cross section of the fabrication liquid discharged portion along the line S1-S1 as illustrated in FIG. 9B.

As in the first embodiment described above, when the first droplets D1 are discharged such that the penetration regions are partially overlapped as illustrated in FIG. 9A, a cross-sectional shape (cross-sectional profile) of the fabrication liquid discharge portion along the line S1-S1 becomes as illustrated in FIG. 9B. In addition, the two adjacent first droplets D1 overlap at equal to or less than half of an area of the first droplets D1 in the arrangement direction of the first droplets D1.

Figure 9C:
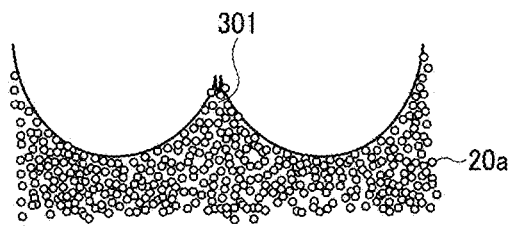

That is, a projection portion 301 is formed at a central portion of four adjacent first droplets D1 disposed in grid shape as illustrated in FIG. 9C. As a result, unevenness on the surface of the fabrication layer 30 occurs as illustrated in FIG. 9B. The unevenness has a height difference of $\Delta h1$.

Figure 10A:
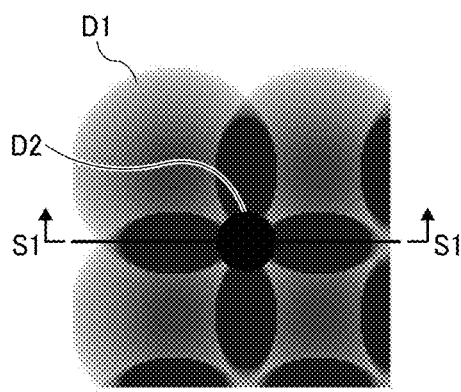
FIGS. 10A and 10B are cross-sectional profiles of the fabrication liquid discharged portion in the first embodiment of the present disclosure.

Next, a cross-sectional profile of the fabrication liquid discharged portion in the present embodiment will be described with reference to FIG. 10. FIG. 10A is a plan view of the fabrication liquid discharged portion, and FIG. 10B is a cross-sectional profile of the fabrication liquid discharged portion along the line S1-S1 in FIG. 10A.

The present embodiment discharges the second droplets D2 so that each second droplet D2 is placed on a central portion of four adjacent first droplets D1 arranged in grid shape as illustrated in FIG. 10C. The liquid amount of the second droplet D2 is smaller than the liquid amount of the first droplet D1.

Figure 10B:
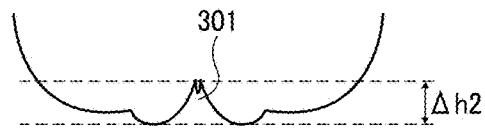

At this time, as illustrated in FIG. 10B, the height of the projection portion 301 decreases because the aggregation of the particles progresses partially in the second droplets D2.

As a result, the height difference of the unevenness on the surface of the fabrication layer 30 becomes $\Delta h2$, which is smaller than $\Delta h1$. Therefore, the height difference of the unevenness in the present embodiment is smaller than in the comparative example. Thus, the smoothness of the surface of the fabrication layer 30 and fabrication quality are increased.

Therefore, the present embodiment can increase the smoothness of the surface of the fabrication layer 30 and also increase the fabrication quality by discharging the second droplet D2 on the portion between two adjacent first droplets D1 and D1 in the arrangement direction of the first droplets D1 discharged on powder 20, which is a portion at which at least two adjacent first droplets D1 and D1 do not overlap. The liquid amount of the second droplet D2 is smaller than the liquid amount of the first droplet D1.

Here, the second droplet D2 can be discharged to a portion including the portion where two adjacent first droplets D1 and D1 overlap or with other first droplets D1 if the portion includes the portion where two adjacent first droplets D1 and D1 do not overlap.

The relative positions of droplets of the fabrication liquid can be checked by temporarily stopping the three-dimensional fabricating apparatus 601 during the operation and checking the fabrication chamber 22 with an optical microscope, etc. Further, the relative positions of droplets of the fabrication liquid can be checked by inserting a thin medium, such as a sheet of paper, between the heads 52 and the fabrication chamber 22 during the operation of the three-dimensional fabricating apparatus 601 and landing the fabrication liquid to the media. The medium on which the fabrication liquid is landed can be observed using an optical microscope, etc. to check the relative positions of of droplets of the fabrication liquid.

The outermost surface of the three-dimensional object fabricated by the present embodiment includes a portion bound by the second droplets D2, the liquid amount of which is smaller than the liquid amount of the first droplets D1, located between two adjacent first droplets D1 in an arrangement direction of the first droplets D1 of the fabrication liquid 10. The portion includes at least a portion where a region bound by two adjacent first droplets D1 do not overlap.

In this case, the area of the portion bound by the second droplets D2 is smaller than the area of the portion bound by the first droplets D2. Further, in the present embodiment, the depth of the portion bound by the second droplets D2 is smaller than the depth of the portion bound only by the first droplets D1 in a lamination direction of the layered fabrication object at the outermost surface of the three-dimensional object as illustrated in FIG. 10B.

Figure 11A:
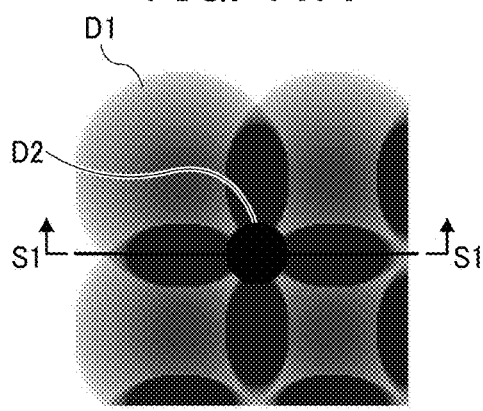
FIGS. 11A and 11B are cross-sectional profiles of the fabrication liquid discharged portion in a second embodiment of the present disclosure.
Figure 11B:

Next, a second embodiment of the present disclosure is described below with reference to FIGS. 11A and 11B. FIG. 11A is a plan view of the fabrication liquid discharged portion in the second embodiment. FIG. 11B is a cross-sectional profile of the fabrication liquid discharged portion along the line S1-S1 in FIG. 11A.

In the second embodiment of the present disclosure, two types of fabrication liquid having different viscosities are used. The viscosity of the fabrication liquid 10 of the first droplet D1 differs from the viscosity of the fabrication liquid 10 of the second droplet D2. Specifically, the viscosity of the fabrication liquid 10 of the second droplets D2 is lower than the viscosity of the fabrication liquid 10 of the first droplets D1.

For example, the viscosity of the fabrication liquid 10 of the first droplets D2 is 8 mPa·s, and the viscosity of the fabrication liquid 10 of the second droplets D1 is 4 mPa·s.

The above-described configuration has an effect such that the fabrication liquid 10 does not easily diffuse in a horizontal direction (in-plane direction of the powder layer 31) and easily diffuses inside the powder layer 31 in a depth direction of the powder layer 31.

As a result, as illustrated in FIG. 11B, the height difference of the surface of the fabrication layer 30 becomes $\Delta h3$, which is smaller than the height difference $\Delta h2$ of the first embodiment. Therefore, the height difference of the unevenness in the second embodiment is smaller than the height difference of the unevenness in the first embodiment, which increases the smoothness of the surface of the fabrication layer 30 and also increases fabrication quality.

Similar effect can be obtained by using two types of fabrication liquid having different surface tensions. The surface tension of the fabrication liquid 10 of the second droplets D2 is higher than the surface tension of the fabrication liquid 10 of the first droplets D1.

Figure 12A:
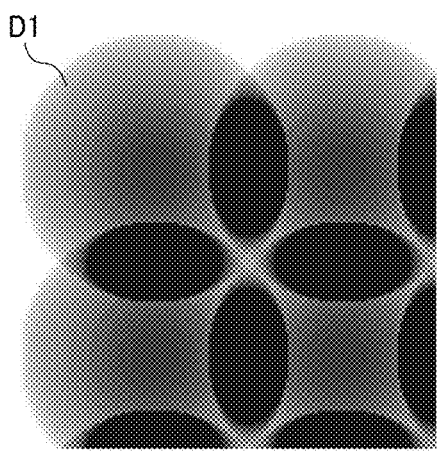
FIGS. 12A and 12B are illustrations of discharged patterns of first droplets and second droplets in a third embodiment of the present disclosure.
Figure 12B:
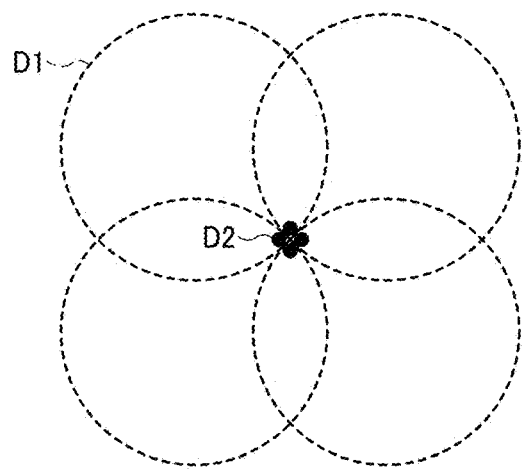
Figure 13A:
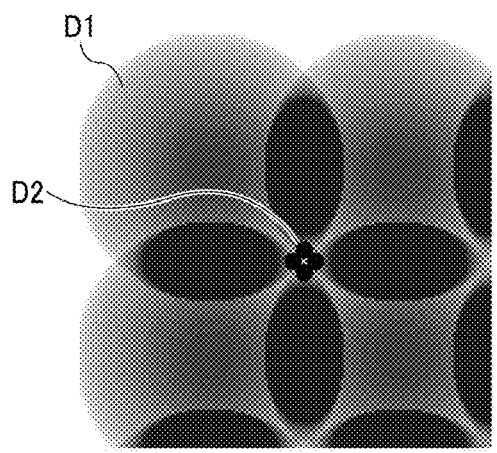
FIGS. 13A and 13B are illustrations of droplets discharged patterns in which first droplets and second droplets overlap.
Figure 13B:
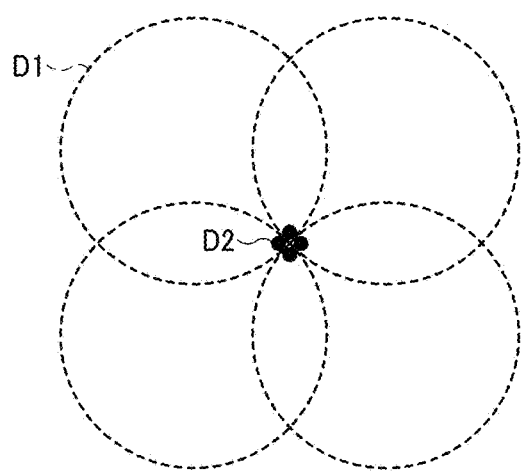
Figure 14A:
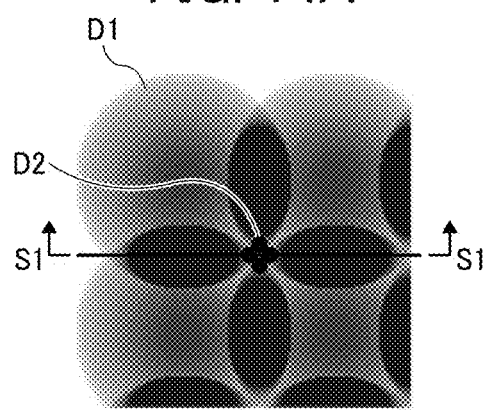
FIGS. 14A and 14B are cross-sectional profiles of the fabrication liquid discharged portion of FIGS. 13A and 13B.
Figure 14B:
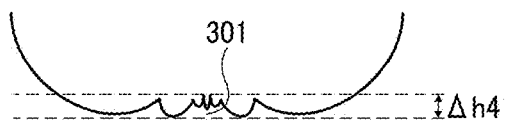

Next, a third embodiment of the present disclosure is described with reference to FIGS. 12A through 14B. FIGS. 12A and 12B are illustrations of a discharge pattern of first droplets and second droplets. FIGS. 13A and 13B are illustrations of a discharge pattern in which the first droplets and the second droplets are overlapped. FIG. 14A is a plan view of the fabrication liquid discharged portion in the third embodiment. FIG. 14B is a cross-sectional profile of the fabrication liquid discharged portion along the line S1-S1 in FIG. 14A. Here, the control circuit 500 discharges the first droplets D1 so that adjacent four droplets of the first droplets D1 arranged in grid shape partially overlap. Then, the control circuit 500 discharges the second droplets D2 so that four droplets of the second droplets D2 are placed on a central portion of the adjacent four droplets of the first droplets D1 arranged in grid shape.

At this time, the height difference $\Delta h4$ ($\Delta h4<\Delta h2$) of the unevenness of the surface of the fabrication layer 30 decreases because the aggregation of the particles partially progresses in the four droplets of the second droplets D2. Therefore, the smoothness of the surface of the fabrication layer 30 and the fabrication quality of the third embodiment are higher than the smoothness and the fabrication quality in the first embodiment.

Figure 15:
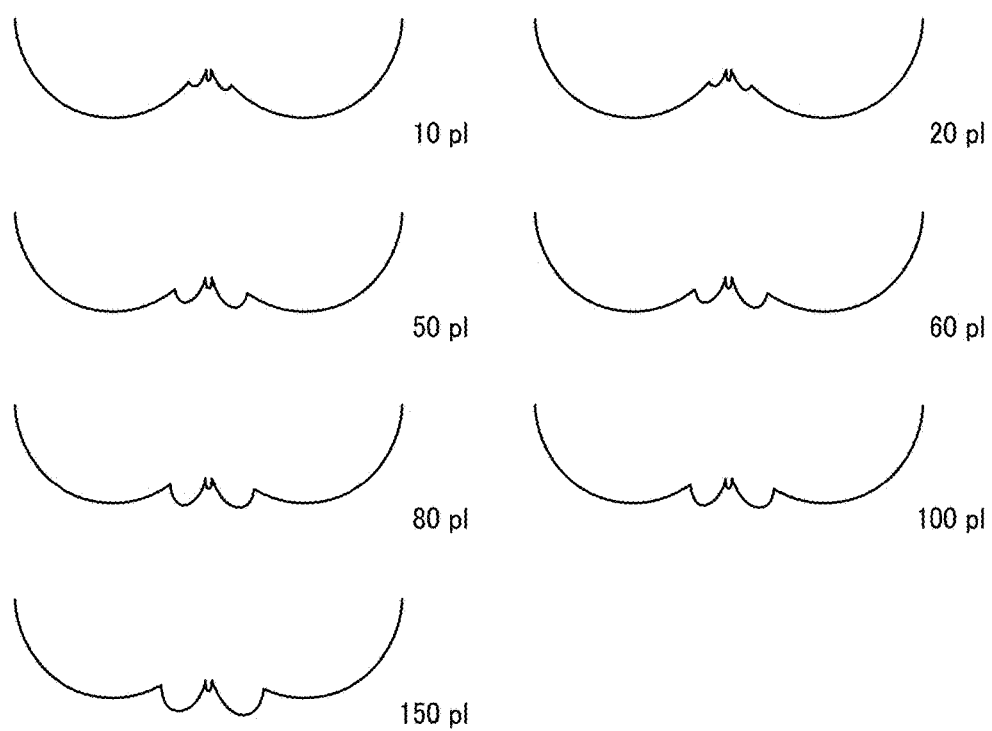
FIG. 15 show cross-sectional profiles when the liquid amount of the second droplets is changed.
Figure 16:
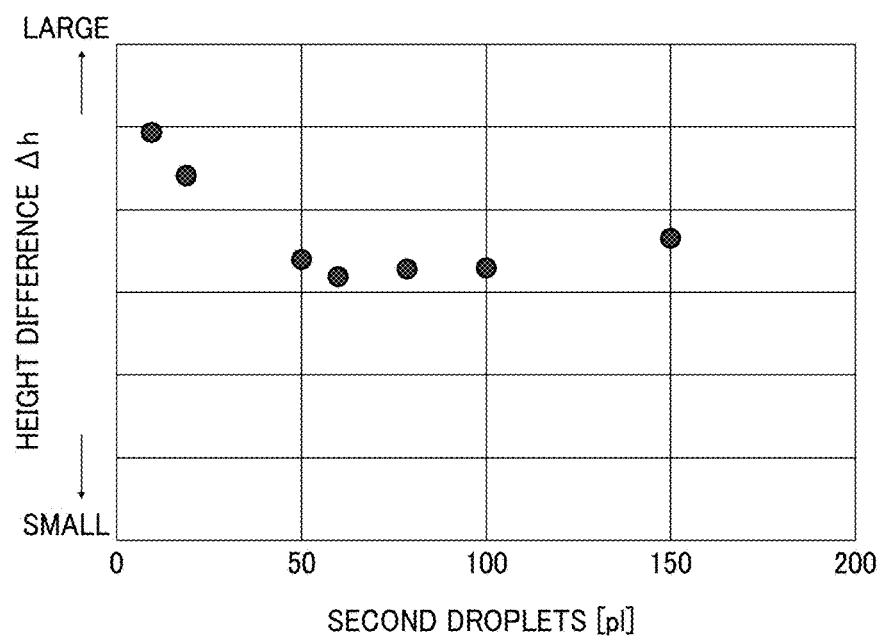
FIG. 16 is a graph describing height differences in FIG. 15.

Here, the liquid amounts of the first droplet D1 and the second droplet D2 are described with reference to FIGS. 15 and 16. FIG. 15 is an illustration of cross-sectional profiles of the first droplet D1 and the second droplet D2 when changing the liquid amount of the second droplet D2. FIG. 16 is graph illustrating the height differences of the cross-sectional profile of the second droplet D2 when changing the liquid amount of the second droplet D2.

The most adequate liquid amount of the first droplet D1 and the second droplet D2 also depends on the discharge pattern. FIG. 15 is an illustration of cross-sectional profiles of the fist droplets D1 and the second droplets D2 when a droplet having a liquid amount of 200 pl is discharged as the first droplet D1 with a resolution of 300 dpi and droplets having liquid amounts of 10 pl, 20 pl, 50 pl, 60 pl, 80 pl, 100 pl, and 120 pl are discharged as the second droplets D2.

The height difference $\Delta h$ for each cross-sectional profile is illustrated in the graph shown in FIG. 16.

In this example, the height difference is relatively small when the liquid amount of the second droplet D2 is from 50 pl to 100 pl. Therefore, the liquid amount of the second droplet D2 is preferably equal to or less than half of the liquid amount of the first droplet Dl.

In each of the embodiments explained above, the powder layer 31, on which the second droplet D2 is discharged, is the powder layer 31 that constitutes at least the outermost surface of the three-dimensional object because the smoothness is required for the outermost surface of the three-dimensional object. Decrease in fabrication speed can be suppressed by reducing the area of the powder layer 31, on which the second droplet D2 is discharged. The second droplets D2 can be discharged to a plurality of powder layers 31 including the powder layer 31 that constitutes the outermost surface of the three-dimensional object.

Figure 17:
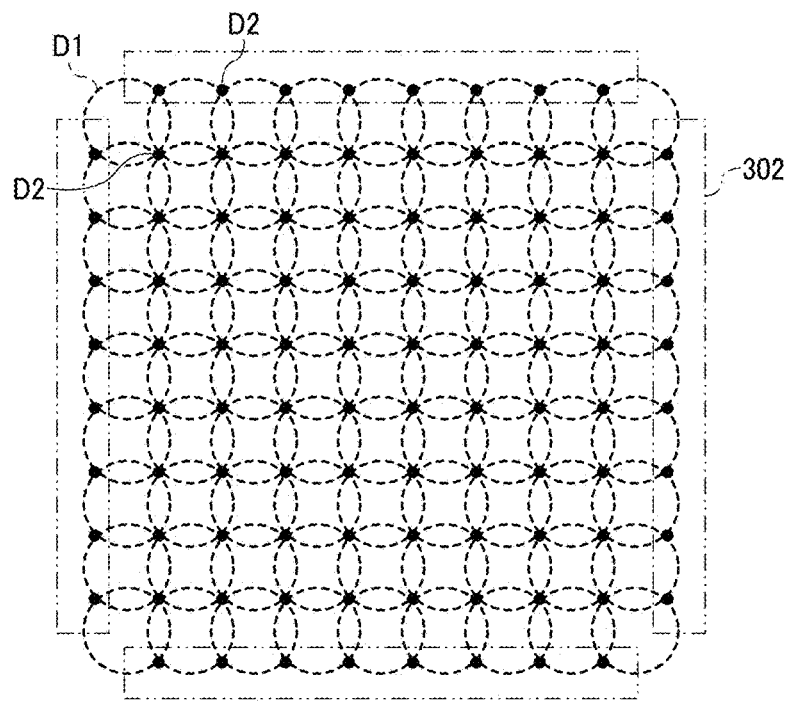
FIG. 17 is a plan view of a fourth embodiment of the present disclosure.

Next, referring to FIG. 17, a fourth embodiment of the present disclosure will be described. FIG. 17 is a plan view of the fourth embodiment.

The control circuit 500 of the fourth embodiment controls the head 52 to also discharge the second droplets D2 on portions between adjacent first droplets D1 and D1, which are located in boundary portions 302 disposed between the fabrication layer 30 and a portion outside the fabrication layer 30 where powder 20 is not bound by the fabrication liquid 10. At the portions on which the second droplets D2 are discharged, the first droplets D1 and D1 do not overlap.

The fourth embodiment can increase the smoothness of the end face of the fabrication layer 30 in a direction perpendicular to the lamination direction of the fabrication layer.

In this case, the liquid amount of the second droplet D2 discharged onto the boundary portion 302 can be the same as the liquid amount of the second droplet D2 discharged on an area other than the boundary portion 302. However, the liquid amount of the second droplet D2 discharged on the boundary portion 302 is preferably about half of the liquid amount of the second droplet D2 discharged on the area other than the boundary portion 302 because the overlap of the first droplets D1 at the boundary portion 302 is less than the overlap of the first droplets D1 at the area other than boundary portion 302.

Figure 18:
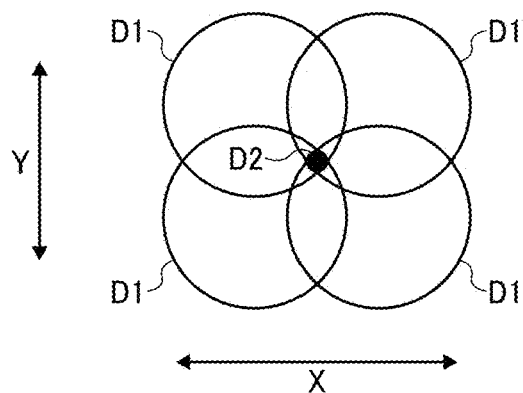
FIG. 18 is a plan view of a fifth embodiment of the present disclosure.

Next, referring to FIG. 18, a fifth embodiment of the present disclosure will be described. FIG. 18 is a plan view of the fifth embodiment.

In the fifth embodiment of the present disclosure as illustrated in FIG. 18, two adjacent first droplets D1 and D1 arranged along the X direction and two adjacent first droplets D1 and D1 arranged along the Y direction are arranged with a pitch at which the four first droplets D1 overlap at a center portion of an overlapping portion of the four first droplets D1. Therefore, at the center portion of the overlapping portion, the four first droplets D1 overlap without a gap to cover the center portion with the four first droplets D1.

Here, the second droplet D2 is discharged on the center portion where four adjacent first droplets D1 overlap.

Even when four first droplets D1 overlap, at the center portion of the overlapping portion of four first droplets D1, a projection portion is formed at the most diffused portion of four first droplets D1 in a lamination direction. Thus, unevenness having a height difference is formed on a surface of the fabrication layer 30.

Therefore, by discharging the second droplet D2 on the overlapping area of four first droplets D1, the height of the projection portion can be decreased.

By discharging the second droplet D2, the liquid amount of which is smaller than the liquid amount of the first droplets D1, at a portion where four adjacent first droplets D1 overlap, the smoothness of the end face of the fabrication layer 30 can be increased.

The outermost surface of the three-dimensional object fabricated by the fifth embodiment of the present disclosure includes at least the portion bound by four adjacent first droplets D1 and the second droplets D2. The liquid amount of the second droplet D2 is smaller than the liquid amount of the first droplet D1. The bound portion is disposed among the region bound by four adjacent first droplets D1 in an arrangement direction of the first droplets D1 of the fabrication liquid 10. The bound portion includes a region where four adjacent first droplets D1 overlap.

Figure 19:
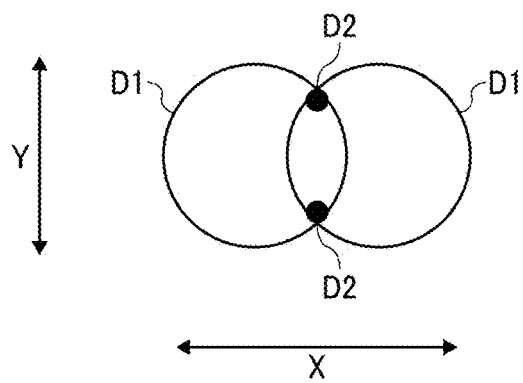
FIG. 19 is a plan view of a sixth embodiment of the present disclosure.

A sixth embodiment of the present disclosure is described below with reference to FIG. 19. FIG. 19 is a plan view of the sixth embodiment.

The control circuit 500 of the sixth embodiment discharges the first droplets D1 at a pitch such that two adjacent first droplets D1 and D1 partially overlap in the X direction (or the Y direction) and discharges the second droplets D2 in a portion where two second droplets D2 overlap.

Even arranging adjacent two first droplets D1 to partially overlap, at the overlapping portion of two first droplets D1, a projection portion is formed at the most diffused portion of first droplets D1 in a lamination direction. Thus, unevenness having height difference is formed on a surface of the fabrication layer 30.

Therefore, by discharging the second droplets D2 on the overlapping portion of two first droplets D1, the height of the projection portion can be decreased, and the smoothness of the end face of the fabrication layer 30 can be increased.

Figure 20:
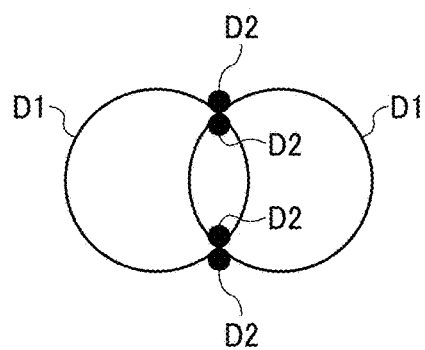
FIG. 20 is a plan view of a seventh embodiment of the present disclosure.

A seventh embodiment of the present disclosure is described below with reference to FIG. 20. FIG. 20 is a plan view of the seventh embodiment.

In the seventh embodiment of the present disclosure as illustrated in FIG. 20, similarly with the sixth embodiment, two adjacent first droplets D1 and D1 are arranged at a pitch such that two adjacent first droplets D1 and D1 partially overlap. The control circuit 500 controls the head 52 to discharge the second droplets D2 on the overlapping portion of two adjacent first droplets D1 and further discharges the second droplets D2 on a portion where two adjacent first droplets D1 do not overlap.

As similar to the fourth embodiment, the seventh embodiment can increase the smoothness of the end face of the fabrication layer 30 in a direction perpendicular to the lamination direction of the fabrication layer.

In the embodiments described above, a three-dimensional fabricating apparatus including two chambers of a supply chamber and a fabrication chamber is described. However, the three-dimensional fabricating apparatus having a configuration of including one chamber of fabrication chamber can also be applied. In this case, a powder is directly supplied to the fabrication chamber, and a flattening member such as a blade or a roller is used for flattening the powder on the fabrication chamber.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An apparatus for fabricating a three-dimensional object, the apparatus comprising:
   a stage;
   a flattening unit to transfer and flatten a powder on the stage;
   a fabrication liquid discharger to discharge droplets of fabrication liquid on a surface of the powder on the stage to bind the powder together to fabricate a layered fabrication object; and
   circuitry to:
   repeat an operation of transferring and flattening the powder by the flattening unit and an operation of discharging, by the fabrication liquid discharger, of a plurality of droplets of the fabrication liquid on the surface of the powder deposited on the stage by the fabrication liquid discharger to fabricate the three-dimensional object by a process of lamination;

control the discharging by the fabrication liquid discharger of the plurality of droplets of the fabrication liquid to the surface of the powder on the stage, including:

discharge of plural first droplets of the fabrication liquid to the surface of the powder on the stage such that the plural first droplets partially overlap; and discharge of a second droplet, a liquid amount of which is smaller than a liquid amount of each of the first droplets, on a portion where the plural partially overlapping first droplets do not overlap, said portion being disposed between the plural first droplets that partially overlap.

2. The apparatus according to claim 1, wherein the plural first droplets overlap at equal to or less than half of an area of each of the first droplets in an arrangement direction of the first droplets.

3. The apparatus according to claim 1, wherein the circuitry discharges the plural first droplets so that four adjacent droplets amongst the first droplets arranged in grid shape partially overlap, and discharges the second droplet on a central portion of the four adjacent droplets amongst the first droplets.

4. The apparatus according to claim 1, wherein the circuitry discharges the second droplet at different positions.

5. The apparatus according to claim 1, wherein the circuitry discharges the second droplet on a boundary between the layered fabrication object and a portion outside the layered fabrication object where powder is not bound by the fabrication liquid.

6. The apparatus according to claim 5, wherein the liquid amount of the second droplet is equal to or less than half of the liquid amount of each of the first droplets.

7. The apparatus according to claim 1, wherein the circuitry discharges two types of fabrication liquid having different viscosities, wherein a viscosity of the fabrication liquid of the second droplet is lower than a viscosity of the fabrication liquid of the first droplets.

8. The apparatus according to claim 1, wherein the circuitry discharges two types of fabrication liquid having different surface tensions, wherein a surface tension of the fabrication liquid of the second droplet is higher than surface tension of the fabrication liquid of the first droplets.

9. A method for fabricating a three-dimensional object with an apparatus for fabricating a three-dimensional object, said apparatus including a fabrication liquid discharger, the method comprising:

(a) transferring and flattening powder deposited on a stage of the apparatus;

(b) controlling discharging by the fabrication liquid discharger of a plurality of droplets of fabrication liquid on a surface of the powder to bind the powder together to fabricate a layered fabrication object, including (b1) discharging plural first droplets of the fabrication liquid onto the surface of the powder such that the plural first droplets partially overlap, and (b2) discharging a second droplet, a liquid amount of which is smaller than a liquid amount of each of the first droplets, on a portion where the plural partially-overlapping first droplets do not overlap, said portion being disposed between the plural first droplets that partially overlap; and (c) repeating the transferring in (a) and the discharging in (b) to fabricate the three-dimensional object by a process of lamination.

10. The method according to claim 9, wherein the plural first droplets overlap at equal to or less than half of an area of each of the first droplets in an arrangement direction of the first droplets.

11. The method according to claim 9, wherein:

the plural first droplets discharged in (b1) include four adjacent droplets that are arranged in grid shape and that partially overlap; and the second droplet is discharged in (b2) on a central portion of the four droplets of the first droplets.

12. The method according to claim 9, wherein in repeating in (c) of the discharging of the second droplet, the second droplet is discharged at different positions.

13. The method according to claim 9, wherein the second droplet is discharged in (b2) on a boundary between the layered fabrication object and a portion outside the layered fabrication object where powder is not bound by the fabrication liquid.

14. The method according to claim 13, wherein the liquid amount of the second droplet discharged in (b2) is equal to or less than half of the liquid amount of each of the first droplets discharged in (b1).

15. The method according to claim 9, wherein the discharging the plurality of the first droplets and the discharging the second droplet discharge two types of fabrication liquid having different viscosities, and wherein a viscosity of the fabrication liquid of the second droplet is lower than a viscosity of the fabrication liquid of the first droplets.

16. The method according to claim 9, wherein the discharging the plurality of the first droplets and the discharging the second droplet discharge two types of fabrication liquid having different surface tensions, and wherein surface tension of the fabrication liquid of the second droplet is higher than the surface tension of the fabrication liquid of the first droplets.

17. A three-dimensional fabrication object comprising:

a laminated layered fabrication object including a powder bound by a fabrication liquid, wherein an outermost surface of the laminated layered fabrication object includes a portion bound by plural partially-overlapping first droplets of the fabrication liquid and a portion bound by a second droplet of the fabrication liquid, a liquid amount of the second droplet is smaller than a liquid amount of each of the first droplets that partially overlap, and wherein the portion bound by the second droplet is disposed between the first droplets that partially overlap.

18. The three-dimensional fabrication object according to claim 17, wherein an area of the portion bound by the second droplet is smaller than an area of the portion bound by the first droplets.

19. The three-dimensional fabrication object according to claim 17, wherein a depth of the portion bound by the second droplet is smaller than a depth of the portion bound by the first droplets in a lamination direction of the laminated layered fabrication object at the outermost surface of the laminated layered fabrication object.

* * * * *